(12) United States Patent
LeCostaouec et al.

(10) Patent No.: US 8,964,192 B2
(45) Date of Patent: Feb. 24, 2015

(54) PRINT VERIFICATION DATABASE MECHANISM

(75) Inventors: Yann LeCostaouec, Westminster, CO (US); Michael Jeffrey Holley, Broomfield, CO (US); Ward Fisher, Lafayette, CO (US); Cheyenne Wills, Boulder, CO (US); Jason Walp, Louisville, CO (US); Nenad Rijavec, Longmont, CO (US); Sathya Vadlamani, Erie, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 169 days.

(21) Appl. No.: 13/311,772

(22) Filed: Dec. 6, 2011

(65) Prior Publication Data

US 2013/0141767 A1    Jun. 6, 2013

(51) Int. Cl.
  *G06F 3/12*    (2006.01)
  *H04N 1/60*    (2006.01)

(52) U.S. Cl.
  USPC ........................................ 358/1.13; 358/1.9

(58) Field of Classification Search
  None
  See application file for complete search history.

(56) References Cited

U.S. PATENT DOCUMENTS

| | | | |
|---|---|---|---|
| 5,237,394 A | 8/1993 | Eaton | |
| 6,501,929 B1 * | 12/2002 | Warbus et al. | 399/130 |
| 6,678,067 B1 | 1/2004 | Reda et al. | |
| 7,167,580 B2 | 1/2007 | Klein et al. | |
| 7,440,608 B2 | 10/2008 | Silverstein | |
| 7,590,289 B2 | 9/2009 | Ishii et al. | |
| 8,120,799 B2 * | 2/2012 | Reddy et al. | 358/1.15 |
| 8,270,603 B1 * | 9/2012 | Durst et al. | 380/54 |
| 2001/0042026 A1 * | 11/2001 | Hinh et al. | 705/26 |
| 2004/0105122 A1 | 6/2004 | Schaeffer | |
| 2005/0030588 A1 * | 2/2005 | Reese et al. | 358/3.28 |
| 2005/0046889 A1 * | 3/2005 | Braudaway | 358/1.14 |
| 2005/0226666 A1 * | 10/2005 | Aoshima et al. | 400/76 |
| 2006/0072952 A1 * | 4/2006 | Walmsley et al. | 400/62 |
| 2006/0080060 A1 * | 4/2006 | Ternasky et al. | 702/123 |
| 2006/0126120 A1 * | 6/2006 | Imafuku et al. | 358/1.18 |
| 2006/0170994 A1 * | 8/2006 | MacKinnon et al. | 358/518 |
| 2007/0129957 A1 * | 6/2007 | Elliott et al. | 705/1 |
| 2007/0226073 A1 * | 9/2007 | Wang | 705/26 |
| 2008/0096486 A1 * | 4/2008 | Whitten | 455/66.1 |
| 2009/0141717 A1 * | 6/2009 | Cabeca et al. | 370/389 |
| 2009/0148002 A1 | 6/2009 | Spitzig | |
| 2009/0199011 A1 * | 8/2009 | Kawara | 713/176 |
| 2009/0259588 A1 * | 10/2009 | Lindsay | 705/40 |
| 2009/0313060 A1 * | 12/2009 | Evevsky | 705/7 |
| 2010/0095129 A1 * | 4/2010 | Wilson | 713/187 |
| 2010/0123002 A1 * | 5/2010 | Caporicci | 235/380 |
| 2010/0214582 A1 * | 8/2010 | Iida | 358/1.9 |
| 2010/0231942 A1 * | 9/2010 | Zhang et al. | 358/1.9 |
| 2010/0265534 A1 * | 10/2010 | Prabhat et al. | 358/1.15 |
| 2011/0002699 A1 * | 1/2011 | Aoki | 399/17 |
| 2011/0096349 A1 * | 4/2011 | Braudaway | 358/1.14 |
| 2011/0116133 A1 * | 5/2011 | Walker et al. | 358/1.18 |
| 2012/0095982 A1 * | 4/2012 | Lennington et al. | 707/706 |

(Continued)

FOREIGN PATENT DOCUMENTS

JP    2000289310    10/2000

*Primary Examiner* — Madelein A Nguyen
(74) *Attorney, Agent, or Firm* — Blakely, Sokoloff, Taylor & Zafman LLP

(57) ABSTRACT

A method is disclosed. The method includes reading image data from a print medium and performing image processing on the image data by querying a database to verify that each object to be included on the print medium appears on the medium in a manner in which it is supposed to appear.

17 Claims, 4 Drawing Sheets

(56) References Cited

U.S. PATENT DOCUMENTS

| | | | |
|---|---|---|---|
| 2012/0136700 A1* | 5/2012 | Evevsky | 705/14.4 |
| 2012/0293840 A1* | 11/2012 | Wilson | 358/1.15 |
| 2013/0128286 A1* | 5/2013 | Tamagawa | 358/1.2 |
| 2013/0159021 A1* | 6/2013 | Felsher | 705/3 |
| 2013/0298001 A1* | 11/2013 | Lundberg et al. | 715/205 |
| 2013/0336530 A1* | 12/2013 | Boncyk et al. | 382/103 |

* cited by examiner

PRINT VERIFICATION DATABASE MECHANISM

FIELD OF THE INVENTION

This invention relates generally to the field of printing systems. More particularly, the invention relates to image processing in a printing system.

BACKGROUND

In the printing industry, it is sometimes necessary to process media multiple times in order to create a final product. For example, media such as paper may be pre-printed in an offset press, then run through a digital press/printer in order to add variable information. Examples of this type of printing include check printing, insurance policies, receipts, etc. Data printed on these forms is particularly important since the information is often used to guarantee traceability, facilitate record keeping, etc. In applications such as check printing, it is crucial that each individual document be readily identifiable and the correct number is printed in a proper location. Accordingly, it is desirable to quickly and easily verify defects in information printed on the medium.

Such printer defects are typically discovered using a print verification system (PVS). PVSs typically operate by digitizing printed pages using means such as photography, video, or scanning to generate test images. Subsequently, these test images are compared to source images that are known to be correct. The source images may be obtained from an input stream to be received at the printer, scanned after printing, or by a number of other methods.

However, current solutions to the problem of finding defects on pages outputted from a printer are limited in several ways. For instance, most approaches use a general pixel by pixel comparison. The drawback to such an approach is that no knowledge of individual objects on a page is used in the determination of whether or not a page is defective. Thus, there is an inability to identify incorrect placement of objects on a page.

Another limitation to current PVSs is a lack of a wider categorization of printed defects that includes a quality metric. For example, in some cases such as in the printing of Japanese Hiragana characters, pixel fidelity is required. However in other cases, such as in a jpeg compressed image, a more broad quality measure may be more appropriate.

Moreover, current PVSs assume that the system control unit is correct. Thus, there is no way to verify control unit errors. Also, generating application errors and operator errors (e.g., the wrong form being fed to the printer) cannot be detected in current PVS systems.

Accordingly, an improved printer verification mechanism is desired.

SUMMARY

In one embodiment, a method is disclosed. The method includes reading image data from a print medium and performing image processing on the image data by querying a database to verify that each object to be included on the print medium appears on the medium in a manner in which it is supposed to appear.

In another embodiment, a print verification system includes one or more image readers to read image data from a print medium, a database including one or more objects that are to be included on the print medium and a processor to perform image processing on the read image data by querying the database to verify that each object to be included on the print medium appears on the print medium in a manner in which it is supposed to appear.

BRIEF DESCRIPTION OF THE DRAWINGS

A better understanding of the present invention can be obtained from the following detailed description in conjunction with the following drawings, in which.

DETAILED DESCRIPTION

A print verification system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
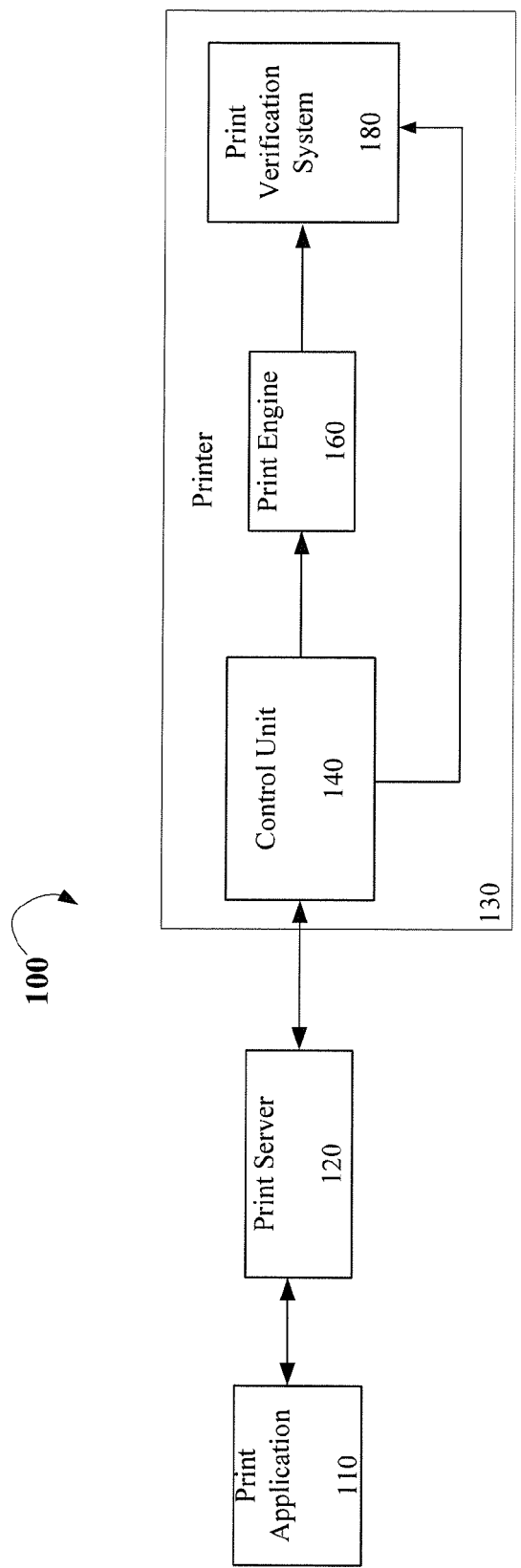
FIG. 1 illustrates one embodiment of a printing system.

FIG. 1 illustrates one embodiment of a printing system 100. Printing system 100 includes a print application 110, a server 120 and a printer 130. Print application 110 makes a request for the printing of a document. In one embodiment, print application 110 provides a print job data stream to print server 120 in a presentation format (e.g., Advanced Function Printing, Post Script, etc.)

Print server 120 processes pages of output that mix all of the elements normally found in presentation documents (e.g., text in typographic fonts, electronic forms, graphics, image, lines, boxes, and bar codes). In one embodiment, the data stream is composed of architected, structured fields that describe each of these elements.

According to one embodiment, printer 130 includes a control unit 140, print engine 160 and print verification system (PVS) 180. In such an embodiment, print server 120 communicates with control unit 140 in order to integrate with the capabilities and command set of printer 130, and to facilitate interactive dialog between the print server 120 and printer 130. In one embodiment, the dialog between the print server 120 and printer 130 is provided according to a device-dependent bi-directional command/data stream.

Control unit 140 processes and renders objects received from print server 120 and provides sheet maps for printing to print engine 160. In such an embodiment, control unit 140 includes a multitude (e.g., ten) of compute node machines, with each node having two or more parallel page output handlers (POH's).

Figure 2:
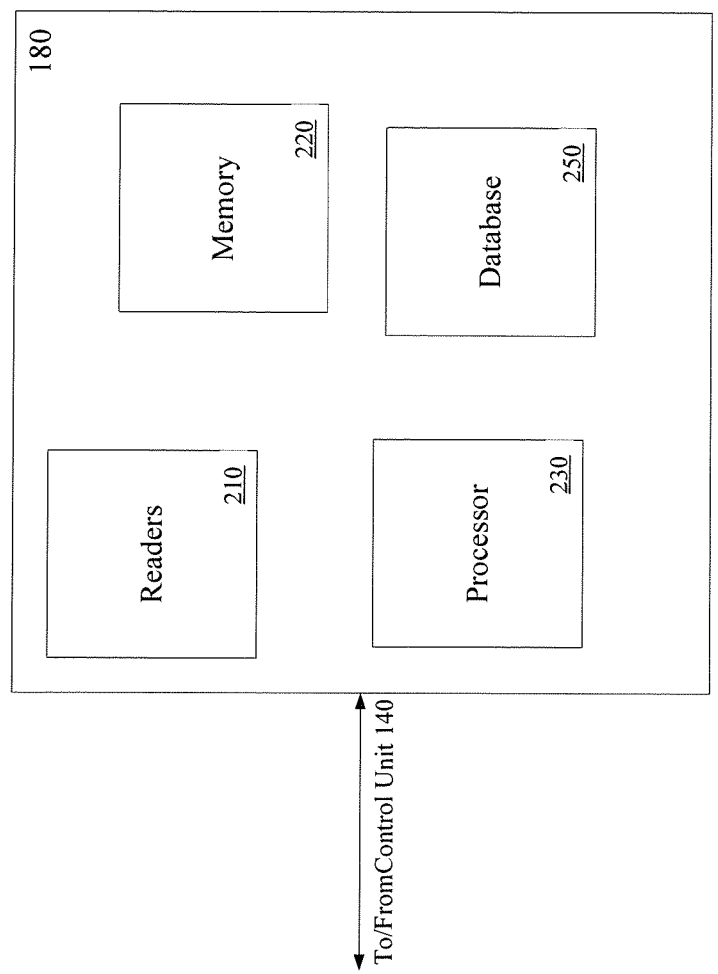
FIG. 2 illustrates one embodiment of a PVS.

PVS 180 analyzes pages printed by print engine 160 in order to identify any defects on the page. FIG. 2 illustrates one embodiment of PVS 180. In one embodiment, PVS 180 operates independent of control unit 140 PVS 180 includes image readers 210, memory 220, processor 230 and database 250. In one embodiment, readers 210 are image line scanners that are positioned to read data printed on each side of a medium that leaves the print engine 160. In a further embodiment, memory 220 and processor 230 comprise a digital computer that is implemented to operate print verification and communicate with control unit 140 via an input/output interface.

According to one embodiment, database 250 is implemented by PVS 180 to provide print verification. In such an embodiment, database 250 includes various objects, rules and criteria metrics. Specifically, database 250 stores objects that are to be applied on each printed page of a print job, rules for when, where and how the objects should appear, and a criteria metric for the desired quality of the printed objects. Thus, whenever an image from print engine 160 is being verified for correctness, each of the objects that are supposed to be on the page is queried from the database.

Figure 3B:
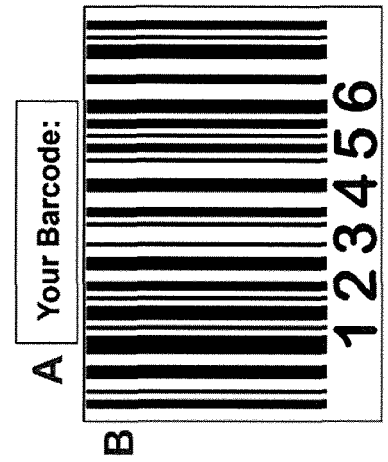
FIG. 3 illustrate embodiments of PVS rules.
Figure 3A:
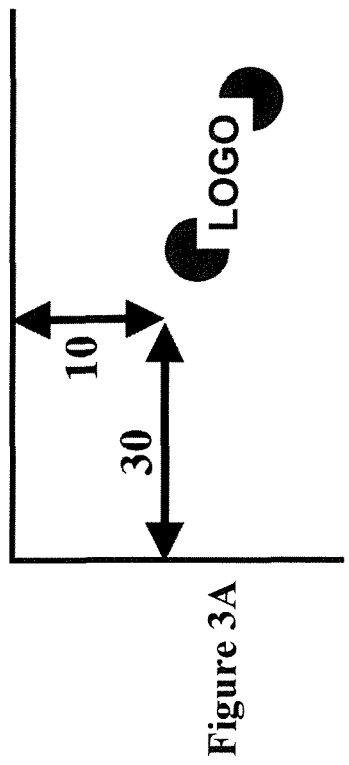

Database objects may include images, line art, barcodes, text, etc., while rules may include information regarding the placement of an object, object combinations (e.g., Object A and Object B always together), color (e.g., Object C has CMYK color values (33, 255, 255, 10)), etc. FIG. 3A illustrates one embodiment of a database placement rule indicating that a logo should be placed at coordinates (30, 10) of a printed page, while FIG. 3B illustrates one embodiment of a database combinations rule indicating Object A and Object B always together.

The criteria metric may be represented in various ways. Examples include broad, detail and legibility quality descriptions. In the broad category, general properties of an object are examined such as proportion, color, sheet cuts, or shifted planes. In the detail category, single pixel precision can be the goal. This category is useful in certain fonts (e.g., Kanji) where a single pixel can change the meaning of a character. The legibility category would be useful in an application such as determining whether or not a barcode is likely to be readable by a scanning device.

Figure 4:
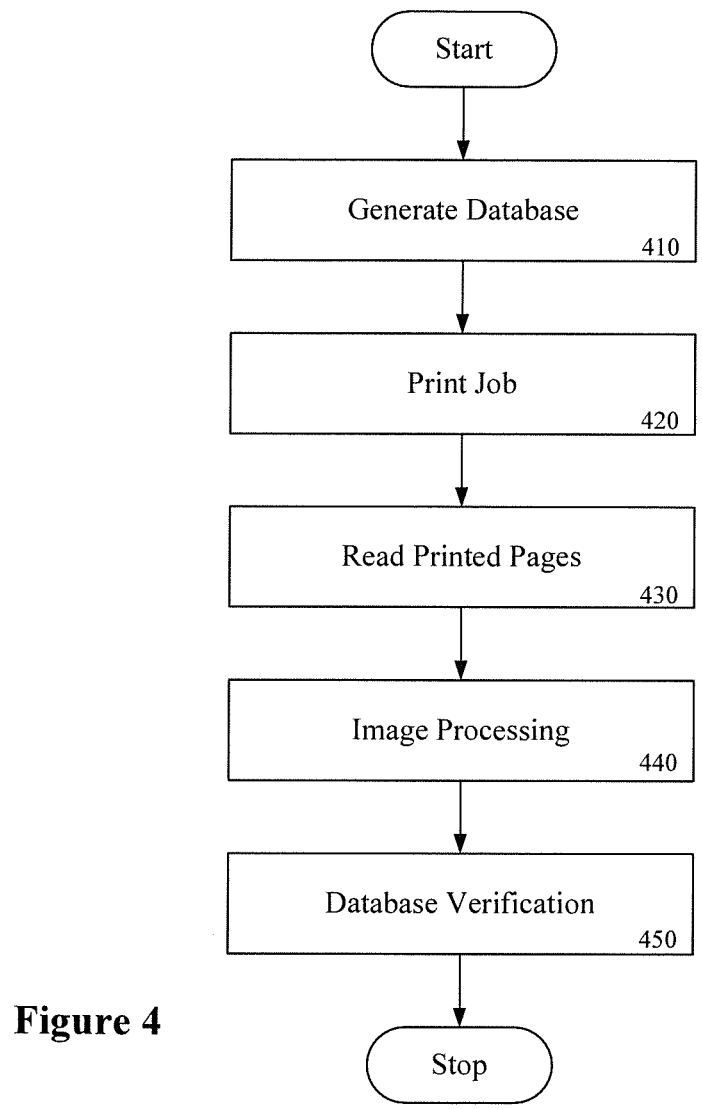
FIG. 4 is a flow diagram illustrating one embodiment of operation of a PVS.

FIG. 4 is a flow diagram illustrating one embodiment of operation of a PVS. At processing block 410, database 250 is generated. In one embodiment, database 250 is automatically generated without user-intervention. In such an embodiment, database 250 is generated by analyzing page data at some point in the printing process before the ink is applied to the medium (e.g., as the page data is being sent to the printer control unit).

In another embodiment, database 250 generation involves user-intervention. In this embodiment, a printer 130 operator assembles the database by locating important objects for verification, cropping them as necessary, and storing them. Corresponding rules and quality criteria for each object are also entered into the database by the operator.

At processing block 420, a print job is initiated, resulting in the production of print pages at print engine 160. At processing block 430, the printed pages are scanned by readers 210. At processing block 440, PVS 180 processes the images read by readers 210. According to one embodiment, image processing includes comparing the scanned images and source images by performing various operations on the images.

In a further embodiment, a normalization process may be implemented. For instance, there may be a difference in brightness between the scanned images and source images, thus normalization is performed to compensate for the differences. Additionally, paper stretching and compressing during the printing process. Therefore, an alignment process (e.g., coordinate transformation) may be implemented to normalize the scanned images and source images.

At processing block 450, database 250 is implemented to provide print verification. As discussed above, PVS 180 verifies each object on a page according to the rules and criteria specified in database 250. For example, PVS 180 may verify that the logo object is placed at coordinates (30, 10) of the verified page, that Object A and Object B are together on the page and/or, Object C has CMYK color values (33, 255, 255, 10)).

In further embodiment, database 250 may be used to verify the output of a printer simulator that produces digital copies of a page(s) on a digital print medium instead of pages printed on a physical medium, such as paper. In yet a further embodiment, processing blocks 440 and 450 may be performed as a combined process and/or the order of processing may be reversed.

Once database verification has been completed, one or more conventional verification processes may also be implemented to detect print page defects. For example, pixel by pixel comparison may be performed to detect excess or missing ink and stray marks, as well as an inspection of regions of variable content for which locations may vary on each print job.

The above-described PVS uses a catalog of objects that enables a discovery of information about a defective printed page. Thus the catalog may provide information, for example as to whether a particular object was printed, the object was positioned in an incorrect location on a page, the object colors are inaccurate and/or the object has been printed with desired quality, the legibility of an object such as a barcode, or whether the value encoded in the barcode matches the value in another object on the page.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A print verification system comprising:
   one or more image readers to read image data from a print medium;
   a database including one or more print job objects that are to be included on the print medium; and
   a processor to perform image processing on the read image data by querying the database to verify that each print job object included in the read image data appears on the print medium in a manner according to object rules and criteria specified in the database, wherein an object rule includes information regarding a desired coordinate placement of a print job object and a criterion provides a desired print quality for the print job object.

2. The print verification system of claim 1 wherein the database object rules and criteria are generated from an analysis of print page data prior to application of ink to the print medium.

3. The print verification system of claim 1 wherein an object rule includes information regarding object combinations.

4. The print verification system of claim 1 wherein an object rule includes information regarding color values for an object.

5. The print verification system of claim 4 wherein the processor verifies that the object includes color values indicated by the object rule.

6. The print verification system of claim 1 wherein the database further comprises criteria metric.

7. The print verification system of claim 6 wherein a criteria metric is implemented to examine general object properties.

8. The print verification system of claim 7 wherein the general object properties comprise one of proportion, color, sheet cuts, or shifted planes.

9. The print verification system of claim 6 wherein a criteria metric is implemented to examine detailed object properties.

10. The print verification system of claim 6 wherein a criteria metric is implemented to determine legibility of an object.

11. A method comprising:
reading image data from a print medium; and
performing image processing on the read image data by querying the database to verify that each print job object included in the read image data appears on the print medium in a manner according to object rules and criteria specified in the database, wherein an object rule includes information regarding a desired coordinate placement of a print job object and a criterion provides a desired print quality for the print job object.

12. The method of claim 11 wherein the database object rules and criteria are generated from an analysis of print page data prior to application of ink to the print medium.

13. The method of claim 11 wherein an object rule includes information regarding object combinations.

14. The method of claim 11 wherein an object rule includes information regarding color values for an object.

15. The method of claim 11 wherein image processing further comprises querying the database to verify that each object appears on the print medium in accordance with one or more criteria metrics.

16. The method of claim 15 wherein a criteria metric is implemented to examine general object properties.

17. The method of claim 15 wherein a criteria metric is implemented to determine legibility of an object.

* * * * *